May 5, 1959 I. WOLFF 2,885,665

PULSE ECHO RECOGNITION SYSTEMS

Filed May 29, 1941

Inventor
Irving Wolff
By
[signature]
Attorney

United States Patent Office 2,885,665
Patented May 5, 1959

2,885,665

PULSE ECHO RECOGNITION SYSTEMS

Irving Wolff, Merchantville, N.J., assignor to Radio Corporation of America, a corporation of Delaware Application May 29, 1941, Serial No. 395,739
26 Claims. (Cl. 343—6.5)

This invention relates to improvements in pulse echo recognition systems and particularly to a pulse echo system in which means are provided whereby a particular signal may be selected and analyzed to determine if it includes recognition components.

It is known to those skilled in the art that pulses of energy may be radiated, reflected by a discontinuity in the medium, received after reflection, and by timing the propagation of the pulse the distance of the reflecting surface may be determined. Moreover, a plurality of pulse reflecting objects at different distances may be indicated separately by a suitable receiver and indicator such as a cathode ray tube. Furthermore, such systems may be used to detect surface vessels, aircraft, and the like. When pulse echo systems are used in time of war, it is desirable to be able to distinguish reflections from friendly and unfriendly craft.

One of the objects of this invention is to provide improved recognition means for a pulse echo system. Another object is to provide means for indicating selectively the character of any one of a plurality of echo signals. Another object is to provide means for indicating a friendly craft by modulating reflections therefrom in accordance with a prearranged code and for analyzing a received signal for components of said code.

Figure 1:
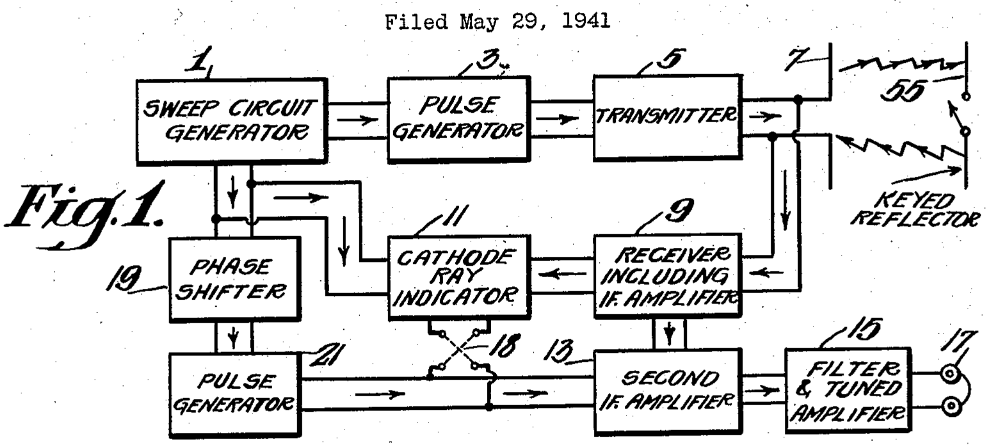
Figures 2, 3:
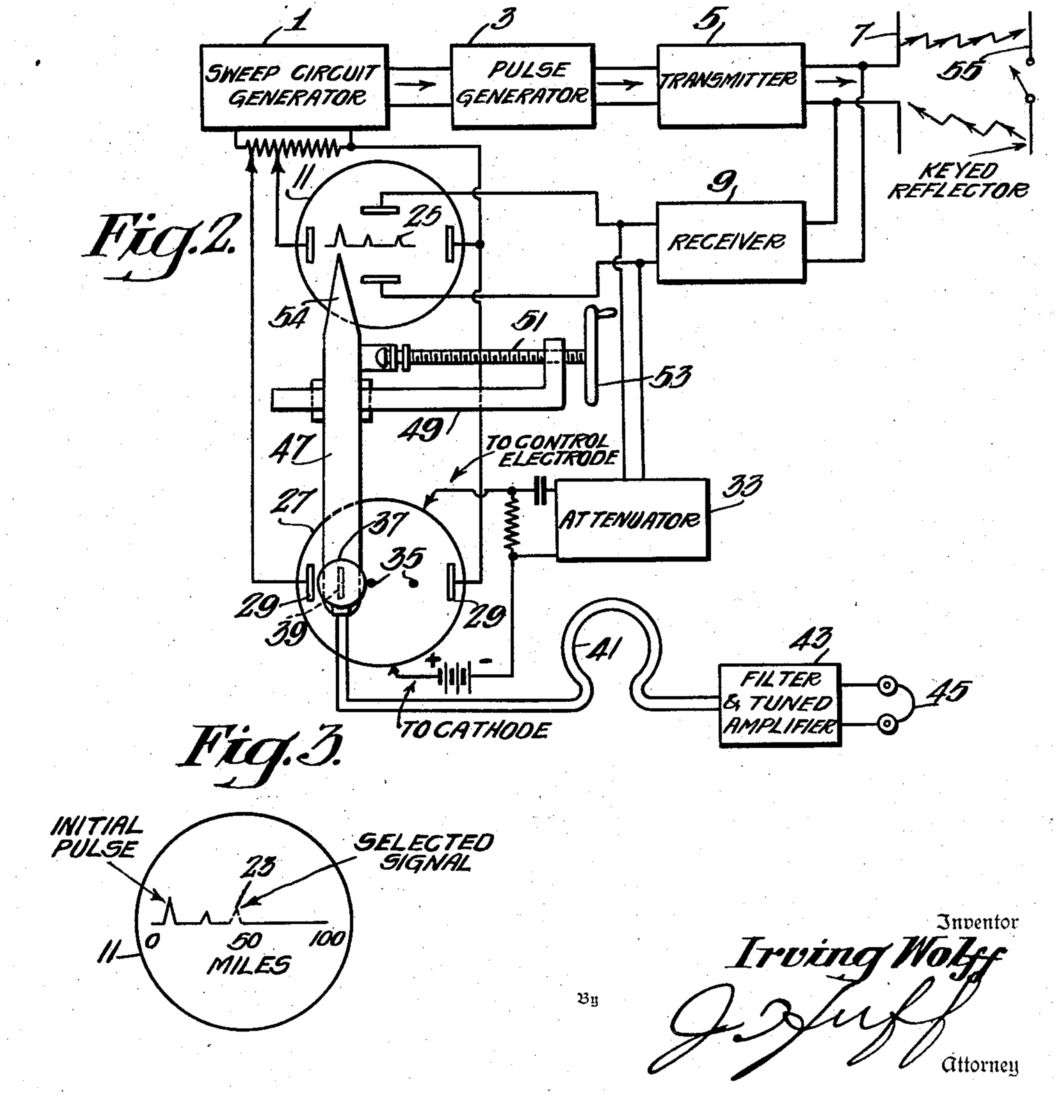

The invention will be described by referring to the accompanying drawing in which Figure 1 is a schematic block diagram illustrating one embodiment of the invention. Figure 2 is a schematic diagram of a modification of the invention; and Figure 3 is an illustration of a cathode ray signal indicator. Similar reference characters indicate similar elements in the drawing.

Referring to Fig. 1, a conventional pulse echo system is represented by the sweep circuit 1 which is connected to a pulse generator 3. The pulse generator is connected to a transmitter 5 and hence to an antenna 7. The antenna 7, or a separate antenna, is connected to the input of a receiver 9. The output of the receiver is applied to a cathode ray indicator 11. The cathode ray indicator is also connected to the sweep circuit generator so that the ray is swept along one coordinate in synchronism with the outgoing pulses. Incoming signal pulses may be applied to move the ray along another coordinate or may be applied to modulate the ray. Due to the persistence of the cathode ray screen and the persistence of vision, the cathode ray trace appears stationary for all except the lower frequency variations of the signal. Thus, if an incoming signal were modulated at twenty or more characters per second, it would be impractical to decipher the signal.

In order that the recognition signals may be differentiated from ordinary echo signals, a second intermediate frequency amplifier 13 is connected to the receiver 9. The output of the intermediate frequency amplifier 13 is applied to an adjustable filter and tunable amplifier 15 to which a signal indicator, for example a telephone receiver 17 or visual indicator, is connected. The sweep circuit generator 1 is connected to a phase shifter 19 which applies currents to a second pulse generator 21. The output pulses are applied to the control electrode of the cathode ray tube 11 and to the second I.-F. amplifier 13.

The operation of the recognition system is essentially as follows: The second I.-F. amplifier is normally biased so that it does not pass signals to the tuned amplifier 15 and telephone receivers. The pulses from the second pulse generator 21 are applied to the second I.-F. amplifier to make it operable by permitting signals to pass from the receiver 9 to the telephones 17. Since the recognition channel only operates when the "unblocking" pulses from the pulse generator 21 are applied, it follows that the channel depends upon the timing or phase of these pulse signals. By adjusting the phase of the unblocking pulses, any particular signal may be selected. The pulse frequency of the generator 3 and the pulse frequency of the generator 21 are identical and the frequency is high enough to be modulated. The pulse signals from an object not carrying the keyed reflector have an unvarying amplitude. The pulse signals from an object carrying a keyed reflector are of an amplitude varying according to the keying frequency. The variation of amplitude is due to the variation of the reflector antenna impedance.

The selection is indicated on the cathode ray tube screen because the unblocking pulses are also applied to the cathode ray control electrode. The effect of the unblocking pulses on the cathode ray will be to brighten the trace, if the pulses are positive. If desired, the reversing switch 18 may be operated and negative pulses may be used to extinguish or dim any particular signal. The dimming or brightening of the selected signal is indicated in Fig. 3 by the broken line 23.

In the modification of the invention shown in Fig. 2, the conventional pulse transmitter 1, 3, 5 and 7 and the conventional pulse receiver 7, 9 and 11 are used to transmit and receive the reflected signals. The received signals are indicated on the cathode ray tube screen as illustrated by the trace 25. A second cathode ray tube 27 is connected so that its horizontal deflecting electrodes 29 are connected in parallel with the corresponding electrodes of tube 11. The control electrode of the cathode ray tube is connected through an attenuator 33 to the output of the receiver 9. The signals received on the second tube 27 may be indicated by a brightening or dimming of the trace as represented by the dots 35.

The variation of the dots 35 is translated into signals by arranging a photoelectric cell 37 so that light, passing through a slit 39, falls on the cell. The cell 37 is connected through flexible leads 41 and a tuned amplifier 43 to telephone 45. The slit 39 may be arranged in a member 47 which is moved along a track 49 by a screw 51. The screw is provided with a handle 53 so that the operator may adjust the member 47 so that a pointer 54 indicates a selected signal on the first tube 11 and slit 39 applies light from the corresponding signal on the screen of the second tube 27 to the cell 37. The operator may move the member 47 so that any particular signal out of a plurality of signals can be analyzed to determine if it includes recognition signals.

The recognition signals, according to a prearranged secret code, may be applied to the reflected pulses by keying a reflector, such as a dipole 55 which is located on the craft to be recognized. It should be understood that any craft within the range of the object detector will reflect the transmitted pulses but a craft provided with one or more antennas tuned to the radiation frequency of the transmitter, may be recognized because the reflections therefrom will be distinctly modulated by the keying of the reflectors. If a signal of greater amplitude is desired, the outgoing pulses may be received and retransmitted from a relay station located on the craft to be recognized. In using the terms echo signals or echo pulses, it should be understood to refer to returning pulses which may be reflected or retransmitted.

Although the majority of the elements of the foregoing systems are well known to those skilled in the art, reference is made to the Physical Review, vol. 28, September 1926, in which an article by Breit and Tuve entitled "A Test of the Existence of the Conducting Layer" describes a pulse echo system. A preferred method of operating the transmitter and receiver on a common antenna is disclosed in copending application Serial No. 184,354, filed January 11, 1938, by Wolff and Hershberger, now Patent No. 2,401,717, issued June 4, 1946, for "Signalling System." One form of pulse generator is described in copending application Serial No. 182,418, filed December 30, 1937, by Irving Wolff, now Patent No. 2,403,624, issued July 9, 1946, for "Apparatus and Method of Pulse Keying." A suitable phase shifter is disclosed in copending application Serial No. 196,863, filed March 19, 1938, by Irving Wolff, now Patent No. 2,407,198, issued September 3, 1946, for "Distance and Directional Determination System." Other elements are shown in copending application Serial No. 343,133, filed June 29, 1940, by Irving Wolff, now Patent No. 2,407,199, issued September 3, 1946, for "Communication and Distance Determining System."

It should be understood that the invention is not limited to pulses transmitted with the velocity of light because the invention may be used with compressional waves for underwater signalling or for sonic signalling systems generally.

I claim as my invention:

1. An object-detecting system including means for transmitting pulses of energy, means for receiving returning pulses from an object to be detected, means for indicating separately the pulses from objects at different distances and separately indicating the distances of said objects from said transmitting and receiving means, the pulses from some of said objects including distinctive signal components, and means for analyzing a selected pulse so that its signal components may be examined.

2. An object-detecting system including means for transmitting pulses of energy, means for receiving pulses corresponding to said transmitted pulses from objects to be detected, the pulses from some of said objects including modulations differing from said transmitted pulses, a cathode ray tube responsive to said received pulses for indicating individually as a function of distance said objects, and means for analyzing selectively one of the said reflections to determine if it includes said modulations differing from said transmitted pulses.

3. An object-detecting system including means for transmitting pulses of energy, means for receiving pulses corresponding to said transmitted pulses from objects to be detected, the pulses from some of said objects including a distinguishable signal, means for indicating separately the pulses from objects at different distances and indicating the respective distances of said objects, means for selecting any one of said separate indications, and means for converting said selected pulse into said distinguishable signal.

4. A pulse echo receiver including a channel responsive to echo signals, means for indicating separately and visually echo signals received from different distances and the respective distances from the receiver to the objects producing said echo signals, some of said echo signals including distinguishable signals, and means responsive only to any selected one of said separate echo signals for converting said selected signal into said distinguishable signals.

5. A pulse echo receiver including a channel responsive to echo signals, a cathode ray tube for indicating separately and visually echo signals received from different distances, some of said echo signals including components convertible into aural signals, means for selecting any one of said echo signals, and means for converting said selected signal into said aural signal.

6. A pulse echo receiver including a channel responsive to echo signals, a first cathode ray tube for indicating separately and visually echo signals received from different distances connected to said channel, a second cathode ray tube for indicating separately echo signals received from different distances connected to said channel, a member carrying a pointer movable with respect to said first cathode ray tube for indicating a selected one of said separate signals on said first cathode ray tube and including a slit for passing light corresponding to said selected signal on said second cathode ray tube, a photoelectric cell responsive to the light passing through said slit for converting said passed light into electric signals, and means connected to said photoelectric cell for reproducing said electric signals.

7. A pulse echo receiver including a channel responsive to echo signals, a first cathode ray tube connected to said channel for indicating separately and visually echo signals received from different distances, a second cathode ray tube connected to said channel for indicating separately echo signals received from different distances, means operably related to said first cathode ray tube for indicating a selected one of said separate signals on said first cathode ray tube, and additional means including light responsive means for converting modulation of the corresponding signal on said second cathode ray tube to electrical signals.

8. A pulse echo receiver including means for indicating separately and visually echo signals received from objects at different distances and said respective distances, an independent and auxiliary receiving channel connected to said receiver and blocked normally to said several echo signals, and adjustable means for applying to said independent and auxiliary receiving channel pulses making the channel responsive only to a selected echo signal.

9. A pulse echo receiver including means for indicating separately and visually and continuously echo signals received from objects at different distances and their respective distances, an auxiliary receiving channel connected to said receiver and blocked normally to said several echo signals, adjustable means for applying to said auxiliary receiving channel pulses making the channel responsive only to a selected echo signal, and means connected to the output of said channel for indicating the components of said selected echo signals.

10. A pulse echo receiver including means for indicating separately and visually echo signals received from differently spaced objects, a receiving channel connected to said receiver and blocked normally to said several echo signals, adjustable means for applying to said receiving channel pulses making the channel responsive only to a selected echo signal, and means for applying said channel-operating pulses to said indicating means to indicate visually the selected echo signals.

11. A pulse echo receiver including means for indicating separately and visually echo signals received from differently spaced objects, a receiving channel connected to said receiver and blocked normally to said several echo signals, adjustable means for applying to said receiving channel pulses making the channel responsive only to a selected echo signal, means for applying said channel-operating pulses to said indicating means to indicate visually the selected echo signals, and means connected to the output of said channel for indicating the components of said selected echo signals.

12. A pulse echo system including a pulse transmitter, a pulse receiver including an indicator responsive to echo signals for indicating the distances of echo-producing objects, means operatively connected to certain of said distant objects for modulating distinctively the signals therefrom, and means including said receiver and indicator for examining a selected one of said echo signals for said distinctive modulation.

13. A pulse echo system including a pulse transmitter, a pulse receiver including an indicator responsive to echo signals for indicating the distances of the echo-producing objects, means on certain of said distant objects for modulating the pulse echo signals reflected therefrom, and means including said receiver and indicator for examining separately the signals corresponding to different distances to detect said modulation.

14. The method of distinguishing certain objects by pulse echoes which includes propagating pulse of energy, distinctively varying the pulse signals from said certain objects, receiving said pulse signals reflected from all objects within a predetermined range, indicating continuously the several distances of said objects, and separately examining said distance-indicating signals for said distinctive variation.

15. The method of distinguishing certain objects responsive to pulse echo signals which includes transmitting to all objects within range pulses of energy, modulating the pulses reflected from said certain objects, receiving the pulses reflected from all objects within range, indicating the distances of said objects as functions of the pulse propagation time of said received signals, selecting one of said distance-indicating signals, and indicating said modulation.

16. The method of distinguishing an object responsive to signals from a pulse echo detection system which includes distinctively modulating the signals from said object, receiving the echo signals from all objects within range of said system, indicating continuously the distances of each of said objects, and examining separately said distance indications for said distinctive modulations.

17. The method of distinguishing an object responsive to signals from a pulse echo detection system which includes distinctively modulating the signals from said object, receiving the echo signals from all objects within range of said system, indicating continuously and visually the distances of each of said objects, and examining separately and aurally said distance indications for said distinctive modulations.

18. The method of distinguishing an object responsive to signals from a pulse echo detection system which includes distinctively modulating the signals from said object, receiving the echo signals from all objects within range of said system, indicating continuously and visually the distances of each of said objects, and converting a selected visual indication into a signal indicating the presence or absence of said distinctive modulation.

19. The method of distinguishing an object responsive to signals from a pulse echo detection system which includes distinctively modulating the signals from said object, receiving the echo sginals from all objects within range of said system, indicating visually the distances, selecting one distance-indicating signal, indicating the selected signal, and converting said selected signal into an aural signal for indicating said distinction modulation.

20. An object-detecting system including means for transmitting pulses of energy, means for receiving pulses corresponding to said transmitted pulses from objects to be detected, means for indicating separately the pulses received from objects at different distances and for indicating the respective distances of said objects, means for selecting one of said separate indications, means for converting said selected indication into an electric signal, and means for analyzing the components of said electric signal.

21. An object detecting system including means for transmitting pulses of energy, means for receiving pulses returning from an object to be detected, a cathode ray tube connected to said receiving means and including a fluorescent screen for indicating separately the pulses from objects at different distances from said transmitting and receiving means, means connected to said receiving means for selecting at least one of said separate pulses, and means including said cathode ray tube for changing the amount of light indicating a selected pulse on said screens so that said selected pulse may be distinguished from the non-selected pulses.

22. The method of indicating a certain object responsive to pulse signals from a pulse echo system which includes converting the pulse signal applied to said object into a distinctively modulated pulse signal, radiating said distinctively modulated signal, receiving pulse echo signals from all objects including said certain object within range of said system, visually indicating the distances of said objects as functions of the propagation times of said pulse echoes, and converting a selected visual indication into an aural indication for determining the presence or absence of said distinctive modulation.

23. The method of indicating a certain object responsive to pulse signals from a pulse echo system which includes converting the pulse signal applied to said object into a distinctively modulated pulse signal, radiating said distinctively modulated signal, receiving pulse echo signals from all objects including said certain object within range of said system, visually indicating the distances of said objects as functions of the propagation times of said pulse echoes, and converting a selected visual indication into a second indication for determining the presence or absence of said distinctive modulation.

24. The method of indicating a certain object responsive to pulse signals from a pulse echo system which includes converting the pulse signal applied to said object into a distinctively modulated pulse signal, radiating said distinctively modulated signal, receiving pulse echo signals from all objects including said certain object within range of said system, indicating the pulses received from objects at different distances as functions of the propagation times of said pulse echoes and converting a selected indication into a second indication for determining the presence or absence of said distinctive modulation.

25. An object-detecting system including a pulse transmitter, a pulse receiver responsive to said pulses after reflections from objects to be detected, an auxiliary channel connected to said receiver and including means for biasing said channel so that it is blocked normally to said received pulses, means for unblocking said channel so that it responds only to a selected signal, means for adjusting the phase of said unblocking so that said auxiliary channel may be operated to receive only one of the reflection signals from a plurality of objects at different distances, and additional means for indicating simultaneously the respective distances of each object of said plurality from said pulse transmitter and pulse receiver.

26. An object-detecting system including a pulse transmitter for radiating pulses to distant objects, a pulse receiver for receiving energy from each of said objects in response to said radiation, an auxiliary channel connected to said receiver and including means for normally blocking said channel to said received energy, means for unblocking said channel so that it responds only to a selected signal, means for adjusting the phase of said unblocking so that said auxiliary channel may be operated to receive only one of the received signals from a plurality of said objects at different distances, and additional means for indicating simultaneously the respective distances of each object of said plurality from said pulse transmitter and pulse receiver.

References Cited in the file of this patent

UNITED STATES PATENTS

| | | |
|---|---|---|
| 1,806,577 | Kolster | May 19, 1931 |
| 1,924,174 | Wolf | Aug. 29, 1933 |
| 2,013,594 | Zworykin | Sept. 3, 1935 |
| 2,142,648 | Linder | Jan. 3, 1939 |
| 2,144,337 | Koch | Jan. 17, 1939 |
| 2,189,549 | Hershberger | Feb. 6, 1940 |
| 2,207,267 | Plaistowe | July 9, 1940 |
| 2,252,083 | Luck | Aug. 12, 1941 |
| 2,423,082 | Busiguies | July 1, 1947 |
| 2,423,644 | Evans | July 8, 1947 |
| 2,433,838 | Elie | Jan. 6, 1948 |

FOREIGN PATENTS

| | | |
|---|---|---|
| 480,572 | Great Britain | Feb. 24, 1938 |